United States Patent
Modi et al.

(10) Patent No.: US 8,700,052 B2
(45) Date of Patent: Apr. 15, 2014

(54) SYSTEMS, METHODS, AND COMPUTER PROGRAM PRODUCTS FOR DETERMINING A LOCATION OF A TRACKED DEVICE AFTER A DEVICE OR NETWORK FAILURE

(75) Inventors: Milap Modi, Fords, NJ (US); James Gordon Beattie, Jr., Bergenfield, NJ (US); Stephen J. Griesmer, Westfield, NJ (US); Robert K. Sharp, King of Prussia, PA (US); Harold Stewart, Cumming, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 187 days.

(21) Appl. No.: 12/831,343

(22) Filed: Jul. 7, 2010

(65) Prior Publication Data

US 2012/0009904 A1   Jan. 12, 2012

(51) Int. Cl.
*H04W 24/00* (2009.01)
(52) U.S. Cl.
USPC .......... 455/456.1; 455/404.1; 455/404.2; 455/456.6; 455/457
(58) Field of Classification Search
USPC .......... 455/414.2, 456.1, 456.2, 456.5, 456.6; 340/539.13, 539.14, 539.15, 539.16, 340/539.17, 539.18, 539.2, 1
See application file for complete search history.

(56) References Cited

U.S. PATENT DOCUMENTS

| | | | |
|---|---|---|---|
| 7,123,141 B2 * | 10/2006 | Contestabile | 340/539.13 |
| 7,231,182 B2 | 6/2007 | Katz | |
| 7,383,050 B2 * | 6/2008 | Kall et al. | 455/456.1 |
| 2001/0022558 A1 * | 9/2001 | Karr et al. | 342/450 |
| 2008/0108370 A1 * | 5/2008 | Aninye | 455/456.1 |

\* cited by examiner

*Primary Examiner* — Lester Kincaid
*Assistant Examiner* — Dung Lam
(74) *Attorney, Agent, or Firm* — Parks IP Law LLC; Jennifer Pearson Medlin, Esq.

(57) ABSTRACT

Systems, methods, and computer program products are for receiving a tracking failure notification including a device identifier of a tracked device that is unavailable because of a failure condition, determining the failure condition as being one of a network failure and a tracked device failure, retrieving known location data of the tracked device including a last known location of the tracked device, determining a potential location of the tracked device, and notifying an entity of the failure condition, the device identifier, and the potential location.

11 Claims, 9 Drawing Sheets

SYSTEMS, METHODS, AND COMPUTER PROGRAM PRODUCTS FOR DETERMINING A LOCATION OF A TRACKED DEVICE AFTER A DEVICE OR NETWORK FAILURE

TECHNICAL FIELD

The present disclosure relates generally to location tracking and, more particularly, to systems, methods, and computer program products for determining a location of a tracked device after a device or network failure.

BACKGROUND

The wireless telecommunications industry has seen tremendous growth over the last several years. Many of today's mobile devices include a location component used to track the location of a user's device. Applications exist that allow a user to track the location of their device, find points-of-interest, and get directions to points-of-interest and other locations. Other applications exist that allow a user to track the location of another device. These applications are popular with parents that want the ability to track the location of their child's device for security and peace of mind.

Unfortunately, situations arise from time to time that may prevent a tracking device from retrieving location information for a tracked device. The systems, methods, and computer program products described herein address this problem.

SUMMARY

According to one aspect of the present disclosure, a method for determining a location of a tracked device includes receiving a tracking failure notification including a device identifier of a tracked device that is unavailable because of a failure condition. The method further includes determining the failure condition as being one of a network failure and a tracked device failure, retrieving known location data of the tracked device including a last known location of the tracked device, determining a potential location of the tracked device, and notifying an entity of the failure condition, the device identifier, and the potential location.

In one embodiment, the tracking failure notification is received in a call, a short messaging service (SMS) message, a multimedia messaging service (MMS) message, an email, an interactive voice response (IVR) message, an emergency services message, or a direct input message.

In one embodiment, the device identifier is a mobile station international integrated services digital network number (MSISDN), an international mobile subscriber identity (IMSI), or an international mobile equipment identity (IMEI).

In one embodiment, the method further includes retrieving for the tracked device a device track history and determining the potential location of the tracked device based upon the device track history.

In one embodiment, the method further includes determining that a pattern exists within the device track history and determining the potential location of the tracked device from the pattern.

In one embodiment, the method further includes determining a set of potential locations, wherein each potential location in the set of potential locations is associated with a specific time at which the tracked device was at the corresponding potential location, comparing the specific time of each corresponding potential location to a particular time, and determining the potential location based upon the comparison.

In one embodiment, the method further includes determining whether the last known location of the tracked device is within a predetermined distance of a second last known location of a second tracked device for which a second tracking failure notification including the second last known location has been received, and if the last known location of the tracked device is within the predetermined distance of the second last known location of the second tracked device, determining the potential location of the tracked device based upon one of second known location data of the second tracked device and a second device track history of the second tracked device. Alternatively, a second tracking failure notification is not received and the last known location of the second device coupled with a common communications history between the two tracked devices is compared to determine a correlation. Other embodiments include multiple (i.e., three or more) tracked device including the first tracked device.

In one embodiment, the method further includes retrieving a communications history including a call history, a message history, and/or a data history for communications to/from the tracked device that occur during a particular time period, and determining the potential location of the tracked device based upon the communications history of the tracked device.

In one embodiment, the method further includes retrieving the known location data of the tracked device from a location database including location information for location-based services subscribers.

According to another aspect of the present disclosure, a computer-readable medium includes computer-readable instructions that, when executed by a processor, cause the processor to perform the steps of the aforementioned method.

According to another aspect of the present disclosure, a system is configured with the computer-readable medium to cause a processor of the system to perform the steps of the aforementioned method.

Other exemplary embodiments of the present disclosure are disclosed herein.

DETAILED DESCRIPTION

Figure 1:
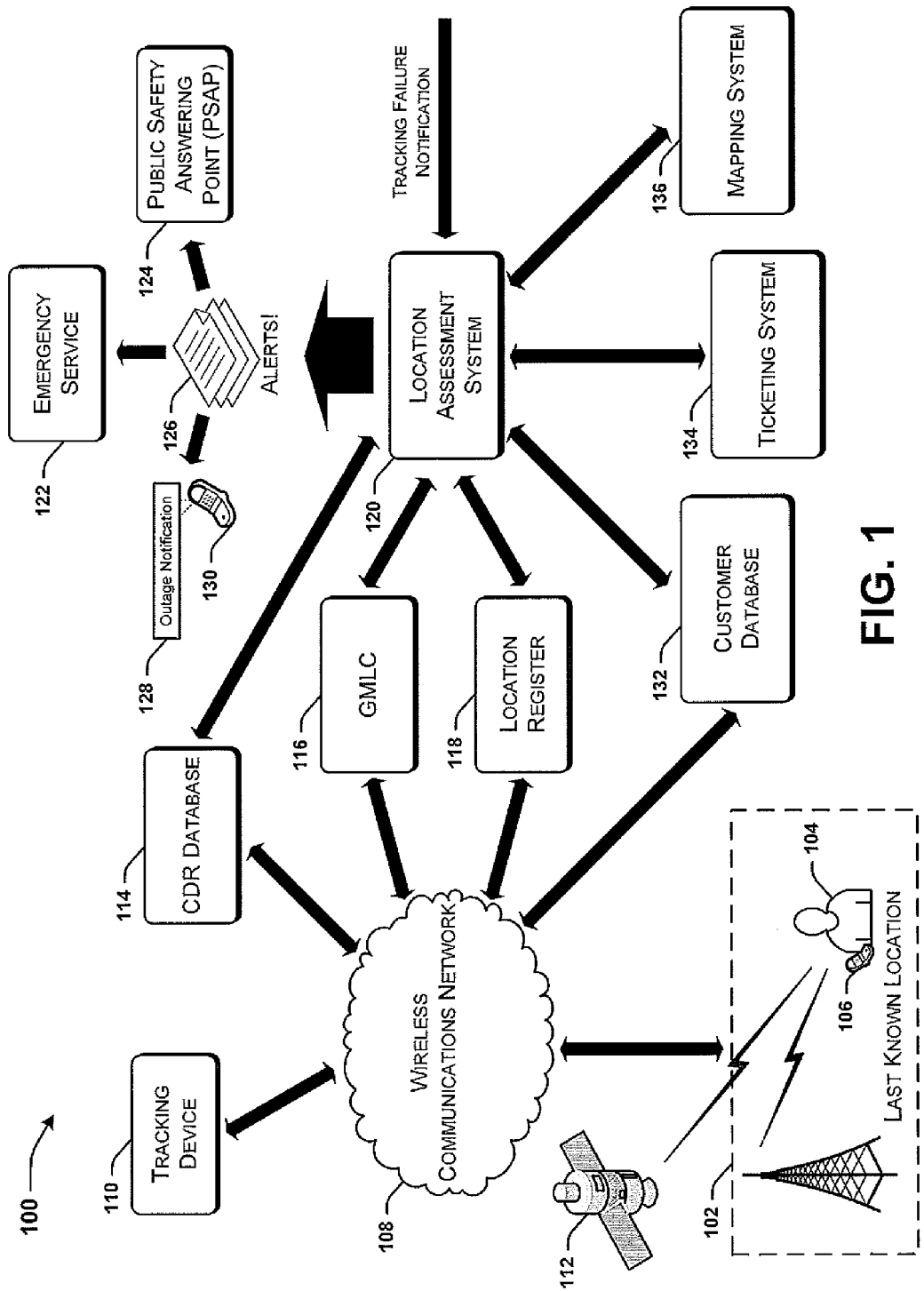
FIG. 1 schematically illustrates a network architecture, according to an exemplary embodiment of the present disclosure.

As required, detailed embodiments of the present disclosure are disclosed herein. It must be understood that the disclosed embodiments are merely exemplary examples of the disclosure that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

While the processes or methods described herein may, at times, be described in a general context of computer-executable instructions, the methods, procedures, and processes of the present disclosure can also be implemented in combination with other program modules and/or as a combination of hardware and software. The term application, or variants thereof, is used expansively herein to include routines, program modules, programs, components, data structures, algorithms, and the like. Applications can be implemented on various system configurations, including servers, network systems, single-processor or multiprocessor systems, minicomputers, mainframe computers, personal computers, handheld computing devices, mobile devices, microprocessor-based consumer electronics, programmable electronics, network elements, gateways, network functions, devices, combinations thereof, and the like.

The systems and methods of the present disclosure may be implemented in wireless networks that use exemplary telecommunications standards, such as Global System for Mobile communications (GSM) and a Universal Mobile Telecommunications System (UMTS). It should be understood, however, that the systems and methods may be implemented in wireless networks that use any existing or yet to be developed telecommunications technology. Some examples of other suitable telecommunications technologies include, but are not limited to, networks utilizing Time Division Multiple Access (TDMA), Frequency Division Multiple Access (FDMA), Wideband Code Division Multiple Access (WCDMA), Orthogonal Frequency Division Multiplexing (OFDM), Long Term Evolution (LTE), and various other 2G, 2.5G, 3G, 4G, and greater generation technologies. Examples of suitable data bearers include, but are not limited to, General Packet Radio Service (GPRS), Enhanced Data rates for Global Evolution (EDGE), the High-Speed Packet Access (HSPA) protocol family, such as, High-Speed Downlink Packet Access (HSDPA), Enhanced Uplink (EUL) or otherwise termed High-Speed Uplink Packet Access (HSDPA), Evolved HSPA (HSPA+), and various other current and future data bearers.

Referring now to the drawings in which like numerals represent like elements throughout the several views, FIG. 1 schematically illustrates a network architecture 100, according to an exemplary embodiment of the present disclosure. The illustrated network architecture 100 includes a last known location 102 in which a tracked person 104 was located prior to a failure condition that caused a tracked device 106 associated with the tracked person 104 to be inaccessible via a wireless communications network 108 for remote location tracking by a tracking device 110.

The tracked device 106, in some embodiments, is a wireless communications device such as a cellular telephone configured to access the wireless communications network 108 via any of the aforementioned wireless communications technologies. Moreover, in some embodiments, the wireless communications network 108 is or includes one or more Wi-Fi™ and/or WiMAX™ access points. The tracked device 106, in such embodiments, is additionally or alternatively configured to access the Wi-Fi™ and/or a WiMAX™ access points for voice, messaging, and/or data communications. The tracked device 106, in some embodiments, is a computer, a game system, a music player, a video player, a camera, a camcorder, a personal digital assistant (PDA), or other device or system configured to communicate with the wireless communications network 108. In any case, under normal conditions (i.e., no failure condition) the location of the tracked device 106 is tracked by the tracking device 110 via a location determining technique. The tracked device 110 may be configured as illustrated and described herein below with reference to a mobile device 300 in FIG. 3.

Location determining techniques, as used herein, refer to any technique that is used to determine a location of the tracked device 106. Exemplary location determining techniques include, but are not limited to, global satellite system (GPS), assisted-GPS (A-GPS), cellular triangulation, Wi-Fi™ triangulation, WiMAX™ triangulation, combinations thereof, and the like. For embodiments in which the tracked device 106 is tracked using GPS or A-GPS, a GPS satellite 112 provides GPS coordinate data alone or in combination with location data obtained using triangulation techniques employed by the wireless communications network 108.

The tracking device 110, in some embodiments, is a wireless communications device such as a cellular telephone configured to access the wireless communications network 108 via aforementioned wireless communications technologies. Moreover, in some embodiments, the wireless communications network 108 is or includes one or more Wi-Fi™ and/or WiMAX™ access points. The tracking device 110, in such embodiments, is additionally or alternatively configured to access the Wi-Fi™ and/or a WiMAX™ access points for voice, messaging, and/or data communications. The tracking device 110, in some embodiments, is a computer, a game system, a music player, a video player, a camera, a camcorder, a personal digital assistant (PDA), or other device or system configured to communicate with the wireless communications network 108. In any case, under normal conditions (i.e., no failure condition) the tracking device 110 tracks the location of the tracked device 106 using a location tracking application operating on the tracking device 110. The tracking device 110 may be configured as illustrated and described herein below with reference to a mobile device 300 in FIG. 3. The location tracking application of the tracking device 110 is described below in greater detail also with reference to FIG. 3.

As noted above, the tracking device 110 tracks the location of the tracked device under normal conditions; that is, when no failure condition is present. A failure condition, in one embodiment, is a network failure, such as a radio access network (RAN) component failure (e.g., a base transceiver station failure, a node-b failure, a base station subsystem failure, a radio network controller failure, and the like), a core network component failure (e.g., a mobile switching center failure, a GPRS support node failure, a location register failure, and the like), a coverage failure (e.g., the tracked device 106 is outside the coverage area of a network operator), a GPS satellite failure, or other network failure resulting in an outage of service that prevents the location of the tracked device 106 from being determined by the location tracking application operating on the tracking device 110. Moreover, a network failure condition may result from a hardware component failure and/or a software component failure of any of the aforementioned network elements.

The failure condition, in another embodiment, is a device failure such as a device component failure (e.g., a transceiver failure, an antennae failure, a processor failure, a battery failure, a memory failure, a location component failure, and the like), or other device failure resulting in an outage of service that prevents the location of the tracked device 106 from being determined by the location tracking application operating on the tracking device 110. Moreover, a device failure condition may result from a hardware component failure and/or a software component failure of any of the aforementioned device elements.

Turning again to the network architecture 100, the wireless communications network 108, as illustrated, is also in communication with a call detail record (CDR) database 114, a gateway mobile location center (GMLC) 116, and a location register 118.

The CDR database 114 is a telecommunications performance management component configured to store CDRs generated by the wireless communications network 108 (e.g., generated by a charging system of the network 108). CDRs, as used herein, refer to call detail records that include information such as calling party number, called party number, date and time of call initiation, date and time of call termination, duration of call, number charged for call, identifier of the network component that generated the record, identifier of the record, result of the call (e.g., answered, busy, interrupted, and the like), call type (e.g., voice call, messaging, data), and any faults that occurred during the call. The same CDR data may be for data and/or messaging.

The GMLC 116 contains functionality required to support location services, such as the location tracking service described herein. The GMLC 116 is the first node an external location services client (e.g., the location tracking application operating on the tracking device 110) accesses in the wireless communications network 108. The GMLC 116 may request routing information from the location register 118. After performing registration authorization, the GMLC 116 sends positioning requests to either a visited mobile switching centre (V-MSC), a serving GPRS support node (SGSN), or a mobile switching center (MSC) (all not illustrated) and receives final location estimates from the corresponding entity.

The location register 118 may be a home location register (HLR), a home subscriber server (HSS), and/or a visiting location register (VLR). The VLR may be logically associated with an MSC (not shown) or may be provided as a separate network element in communication with the MSC. The VLR is a database configured to store all subscriber data that is required for call processing and mobility management for mobile subscribers that are currently located in an area controlled by the VLR. The HLR, and similarly the HSS, is a database configured to provide routing information for mobile terminated calls and various messaging communications. The HLR/HSS is also configured to maintain subscriber data that is distributed to the relevant VLR or the GPRS support node (not shown) through an attach process and to provide mobility management procedures, such as location area and routing area updates. The HLR/HSS may be logically associated with an authentication center (AuC) or may be provided as a separate network element in communication with the HLR/HSS.

The CDR database 114, the GMLC 116, and the location register 118 are each in communication with a location assessment system 120. The location assessment system 120, in one embodiment, is accessible by a user of the tracking device 110 to submit a tracking failure notification to the location assessment system 120 to request support in obtaining a location of the tracked device 106 in the event of a network or device failure that prevents the tracking device 110 from determining the location of the tracked device 106. In one embodiment, the user submits a tracking failure notification directly to the location assessment system 120 via a call, a text message (e.g., short messaging service), a multimedia message (e.g., multimedia messaging service), an email, a chat client, combinations thereof, and the like. In another embodiment, the user communicates through an intermediary that sends the tracking failure notifications to the location assessment system 120. The intermediary may be, for example, a human agent, an artificial intelligence agent, an interactive voice response (IVR), a website, an emergency service 122 (e.g., law enforcement, ambulance, firefighter, military), a public safety answering point (PSAP) 124, combinations thereof, and the like, in which case a tracking failure notification is provided to the location assessment system 120 via a direct input message created by or for the intermediary and submitted to the location assessment system 120 for processing.

The location assessment system 120, in another embodiment, is configured to monitor network conditions and location of the tracked device 106 for the user in addition to or as an alternative to the tracking application operating on the tracking device 110. In this embodiment, should a failure condition prevent the location of the tracked device 106 from being determined, the location assessment system 120 may initiate a location determining process, such as described herein below with reference to FIG. 4.

The location assessment system 120, in one embodiment, is configured to receive a tracking failure notification including a device identifier of the tracked device 106. The device identifier is a mobile station international integrated services digital network number (MSISDN), an international mobile subscriber identity (IMSI), or an international mobile equipment identity (IMEI). The location assessment system 120 is further configured to determine the failure condition as being one of a network failure and a tracked device failure, and retrieve known location data of the tracked device. The known location data includes at least a last known location of the tracked device obtained from the GMLC 116 based upon information stored in the location register 118 or directly from the location register 118. The location assessment system 120 is further configured to determine a potential location of the tracked device 106 based upon the known location data, and notify an entity of the failure condition, the device identifier, and the potential location. In the illustrated embodiment, this notification is an alert 126 and the entity is one of the PSAP 124 and the emergency service 122. After receiving the alert 126, the entity, for example the PSAP 124, can deploy emergency service 122 to the potential location in an effort to locate the tracked person 104. The location assessment system 120 is also configured to generate an outage notification 128 in the event of a network outage to notify available devices (e.g., a device 130) operating in the wireless communications network 108 of a location of the network outage. The alert 126 may be formatted as a short messaging service (SMS) message, a multimedia messaging service (MMS) message, an email, a radio, a television broadcast, an Internet website update, a cell broadcast, or the like.

In the illustrated embodiment, the location assessment system 120 is also in communication with a customer database 132, a ticketing system 134, and a mapping system 136. The customer database 132 is configured to store customer data for customer that receive wireless service from a network operator of the wireless communications network 108. Customer data, in some embodiments, includes one or more of a mobile subscriber integrated services digital network number (MSISDN), an international mobile subscriber identity (IMSI), an international mobile equipment identity (IMEI), a home cell identifier, a work cell identifier, a home network identifier, a roaming network identifier, a most recent location, a last known location, frequented locations, and the like. Customer data may alternatively or additionally include demographics such as sex, race, age, income, disabilities, education, home ownership, employment status, home address, work address, and other demographics. In one embodiment, the customer database 132 is configured to provide all or a portion of customer data to the location assessment system 120 for use by the location assessment system 120 in determining a potential location of the tracked device 106 in the event of a failure condition in accordance with various embodiments described in greater detail herein.

The ticketing system 134 is configured to create and manage trouble tickets for the wireless communications network 108. For example, customers may notify the operator of the wireless communications network 108 of poor or no signal in a particular area. The ticketing system 134 then creates a trouble ticket summarizing same. The location assessment system 120 may also request a trouble ticket based upon information received in a tracking failure notification. Alternatively, the ticketing system 134 may receive the tracking failure notification routed from the location assessment system 120 or directly from the tracking device 110 or the user of the tracking device 110. The ticketing system 134 may assign priority to tickets such that higher priority network issues are addressed before lower priority network issues. Issues for which a tracked device is being considered, for example when the tracked device 106 is unable to be located potentially due to a network outage identified by a ticket, may be given higher priority than tickets for which no particular device is being considered. The ticketing system 134 may distribute tickets to outage management teams for repair or otherwise resolving the network outage.

The mapping system 136 is configured to store maps, such as ortho-photo maps, and latitude/longitude coordinates mapped to street addresses or other locations. In one embodiment, the mapping system 136 is configured to provide the stored map, coordinate, and/or other location data to the location assessment system 120 upon request or automatically for use by the location assessment system 120 to map location data of the tracked device 106.

Figure 2:
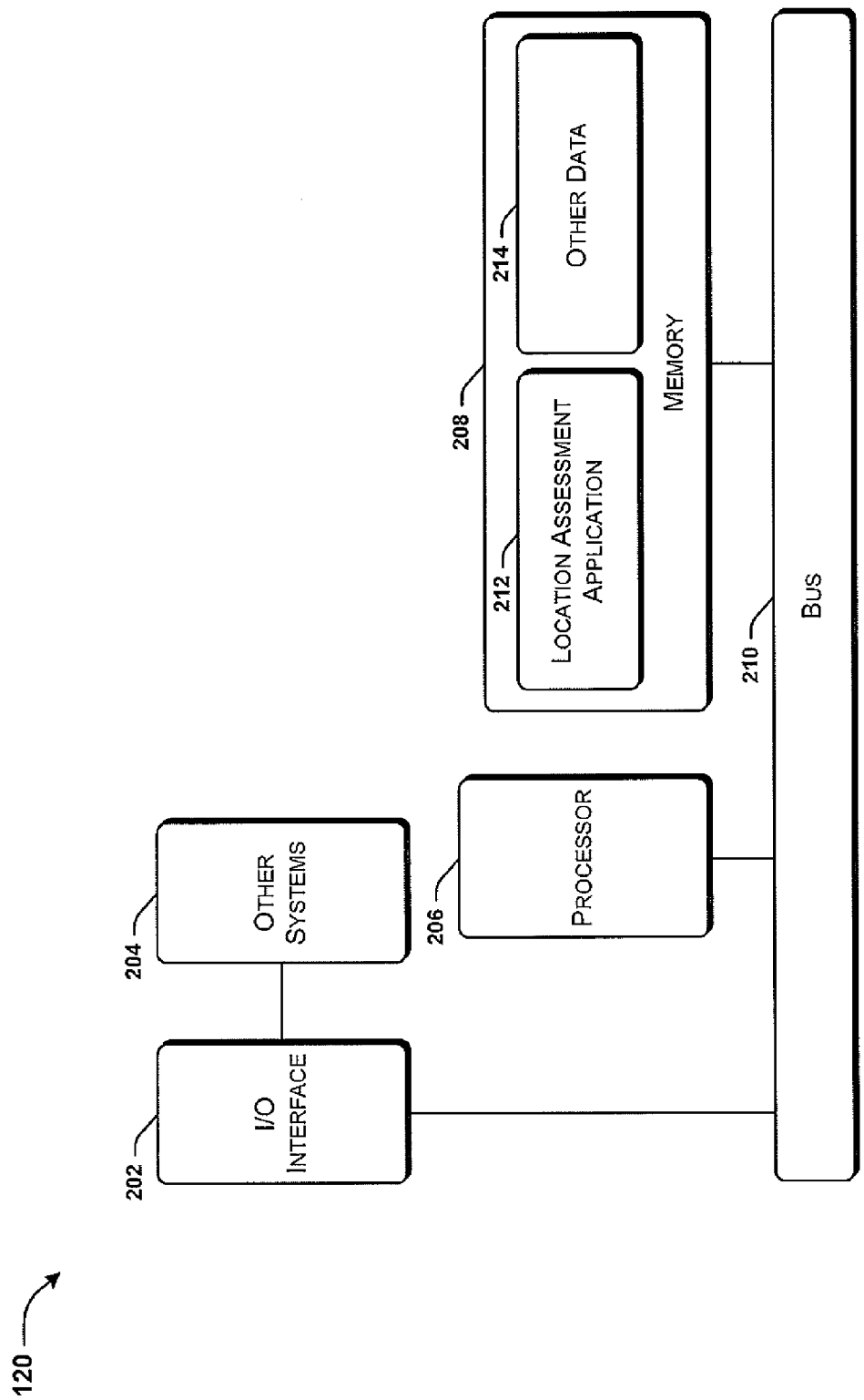
FIG. 2 schematically illustrates a location assessment system and components thereof, according to an exemplary embodiment of the present disclosure.

Turning now to FIG. 2, the location assessment system 120 and components thereof are illustrated, according to an embodiment of the present disclosure. Although connections are not shown between all components illustrated in FIG. 2, the components can interact with each other to carry out various system functions described herein. It should be understood that FIG. 2 and the following description are intended to provide a general description of a suitable environment in which the various aspects of some embodiments of the present disclosure can be implemented.

The location assessment system 120 includes an input/output interface 202 for facilitating communications between the location assessment system 120 and other systems 204, such as the CDR database 114, the GMLC 116, the location register 118, the customer database 132, the ticketing system 134, and the mapping system 136, and other systems or components of the wireless communications network 108.

The location assessment system 120 also includes one or more processors 206 that are in communication with one or more memory modules 208 via one or more memory/data busses 210. The processor(s) 206 is configured to execute instructions of a location assessment application 212 stored on a tangible, non-transitory computer-readable medium, such as the illustrated memory module(s) 208, to facilitate the determination of one or more potential locations of the tracked device 206.

The term "memory," as used herein to describe the memory module(s) 208, collectively includes all memory types associated with the location assessment system 120, such as, but not limited to, processor registers, processor cache, random access memory (RAM), other volatile memory forms, and non-volatile, semi-permanent or permanent memory types; for example, tape-based media, tangible optical media, solid state media, hard disks, combinations thereof, and the like. While the memory module(s) 208 is illustrated as residing proximate the processor(s) 206, it should be understood that the memory module(s) 208 is in some embodiments a remotely accessible storage system. Moreover, the memory module(s) 208 is intended to encompass network memory and/or other storage devices in wired or wireless communication with the location assessment system 120. The memory module(s) 208 may also store other data 214, which may include cached customer information, cell site information, map/location information, CDRs, and the like.

Figure 3:
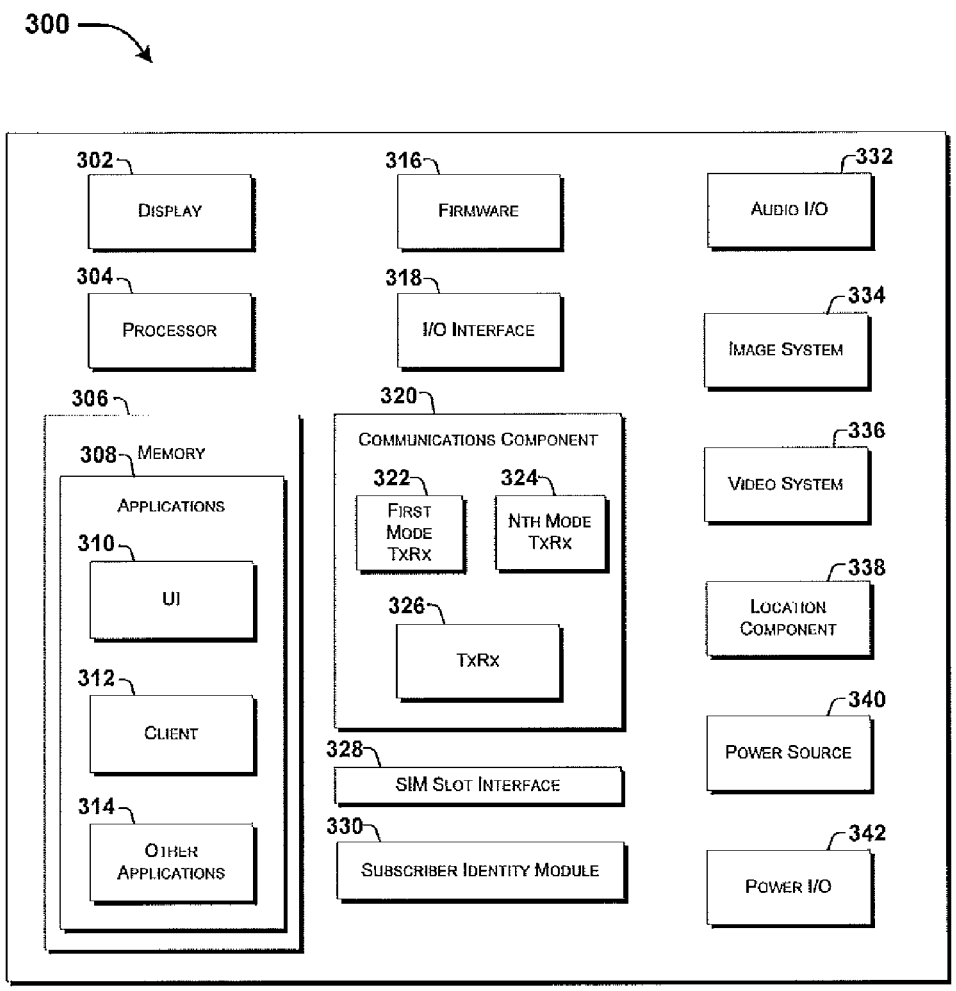
FIG. 3 schematically illustrates an exemplary mobile communications device and components thereof, according to an embodiment of the present disclosure.

Referring now to FIG. 3, a schematic block diagram of an exemplary mobile device 300 is illustrated. Although connections are not shown between the components illustrated in FIG. 3, the components can interact with each other to carry out device functions. In some embodiments, for example, the components are arranged so as to communicate via one or more busses (not shown). It should be understood that FIG. 3 and the following description are intended to provide a general understanding of a suitable environment in which various aspects of embodiments of the present disclosure can be implemented.

In some embodiments, the tracked device 106 and the tracking device 110, both illustrated in FIG. 1, are configured like the illustrated mobile device 300, now described. In some embodiments, the mobile device 300 is a multimode headset configured to provide access to more than one network type including, for example, the telecommunications technologies described above and/or other technologies such as Wi-Fi™ and WiMAX™.

In some embodiments, the mobile device 300 includes computer-readable media, including, for example, volatile media, non-volatile media, removable media, and non-removable media. The term "computer-readable media" and variants thereof, as used herein, refer to storage media and communication media. In some embodiments, storage media includes volatile and/or non-volatile, removable, and/or non-removable media. For example, storage media includes random access memory (RAM), read-only memory (ROM), electrically erasable programmable read-only memory (EE- PROM), solid state memory or other memory technology, CD ROM, DVD, or other optical disk storage, magnetic tape, magnetic disk storage or other magnetic storage devices, or any other tangible, non-transitory medium that can be used to store the desired information and that can be accessed by the mobile device 300.

As illustrated in FIG. 3, the mobile device 300 includes a display 302 for displaying multimedia such as, for example, SMS messages, multimedia messaging service (MMS) messages, customer service messages, over-the-air (OTA) messages, unstructured supplementary service data (USSD) messages, voicemail notification messages, application graphical user interfaces (GUIs), text, images, video, telephony functions, such as Caller ID data, setup functions, menus), music, metadata, wallpaper, graphics, Internet content, device status, preferences settings, map and location data, profile (e.g., vibrate, silent, loud) selection, and the like.

The illustrated mobile device 300 also includes a processor 304 for processing data and/or executing computer-executable instructions of one or more applications 308 stored in a memory 306. In some embodiments, the application(s) 306 include a user interface (UI) application 310. The UI application 310 interfaces with a client 312 (e.g., an operating system (OS)) to facilitate user interaction with device functionality and data. In some embodiments, the client 312 is one of Symbian OS, Microsoft® Windows® Mobile OS (available from Microsoft Corporation of Redmond, Wash.), Palm® webOS™ (available from Palm Corporation of Sunnyvale, Calif.), Palm®OS (available from Palm Corporation), RIM® BlackBerry® OS (available from Research In Motion Limited of Waterloo, Ontario, Canada), Apple® iPhone® OS (available from Apple Corporation of Cupertino, Calif.), or Google Android™ OS (available from Google Inc. of Mountain View, Calif.). These operating systems are merely exemplary of the operating systems that may be used in accordance with the embodiments disclosed herein.

The UI application 310 aids a user in activating service OTA, if applicable, entering message content, viewing received messages (e.g., MMS messages, SMS messages, USSD messages, OTA messages), answering/initiating calls, entering/deleting data, entering and setting user IDs and passwords for device access, configuring settings, manipulating address book content and/or settings, multimode interaction, interacting with other applications 314, and the like.

In one embodiment, the other applications 314 include a location tracking application for use by the mobile device 300 (i.e., the tracking device 110 in this embodiment) to track the location of the tracked device 106 conveniently and remotely. The location tracking application may incorporate any location determining technique to track the location of the tracked device 106. The location tracking application may be configured to generate and send a tracking failure notification to the location assessment system 120 in the event of a failure condition that prevents the location tracking application from acquiring the location of the tracked device 106. The tracking failure notification may be automatically generated and sent by the location tracking application or may be generated and sent after being prompted to do so by a user of the tracking device 110.

In some embodiments, the other applications 314 include, for example, visual voicemail applications, messaging applications (e.g., SMS, enhanced messaging service (EMS), MMS applications), presence applications, text-to-speech applications, speech-to-text applications, add-ons, plug-ins, email applications, music applications, video applications, camera applications, location service applications (LSAs), power conservation applications, game applications, productivity applications, entertainment applications, enterprise applications, combinations thereof, and the like. The applications 308 are stored in the memory 306 and/or in a firmware 316, and are executed by the processor 304. The firmware 316 may also store code for execution during device power up and power down operations.

The illustrated mobile device 300 also includes an input/output (I/O) interface 318 for input/output of data, such as, for example, location information, presence status information, user IDs, passwords, and application initiation (start-up) requests. In some embodiments, the I/O interface 318 is a hardwire connection, such as, for example, a USB, mini-USB, audio jack, PS2, IEEE 1394, serial, parallel, Ethernet (RJ48) port, RJ11 port, or the like. In some embodiments, the I/O interface 318 accepts other I/O devices such as, for example, keyboards, keypads, mice, interface tethers, stylus pens, printers, thumb drives, touch screens, multi-touch screens, touch pads, trackballs, joysticks, microphones, remote control devices, monitors, displays, liquid crystal displays (LCDs), combinations thereof, and the like. It should be appreciated that the I/O interface 318 may be used for communications between the mobile device 300 and a network device or local device, instead of, or in addition to, a communications component 320.

The communications component 320 interfaces with the processor 304 to facilitate wired/wireless communications with external systems. Example external systems include, but are not limited to, SMSCs, intranets, network databases, network storage systems, cellular networks, location servers, presence servers, Voice over Internet Protocol (VoIP) networks, local area networks (LANs), wide area networks (WANs), metropolitan area networks (MANs), personal area networks (PANs), and other networks, network components, and systems described herein. In some embodiments, the external systems are implemented using Wi-Fi™, WiMAX™, combinations and/or improvements thereof, and the like. In some embodiments, the communications component 320 includes a multimode communications subsystem for providing cellular communications via different cellular technologies. In some embodiments, for example, a first cellular transceiver 322 operates in one mode, such as, GSM, and an Nth cellular transceiver 324 operates in a different mode, such as UMTS. While only two cellular transceivers 322, 324 are illustrated, it should be appreciated that a plurality of transceivers can be included.

The illustrated communications component 320 also includes an alternative communications transceiver 326 for use by other communications technologies such as, for example, WiFi™, Wi-Max™, BLUETOOTH, infrared, infrared data association (IRDA), near field communications (NFC), other RF, and the like. In some embodiments, the communications component 320 also facilitates reception from terrestrial radio networks, digital satellite radio networks, Internet-based radio services networks, combinations thereof, and the like.

The communications component 320 processes data from a network such as, for example, the Internet, an intranet (e.g., business intranet), a home broadband network, a Wi-Fi™ hotspot, and the like, via an Internet service provider (ISP), digital subscriber link (DSL) provider, or broadband provider. In some embodiments, the communications component 320 facilitates the transmission of authentication information from the mobile device 300 to a network for processing in accordance with the methods described herein.

The illustrated mobile device 300 also includes a SIM slot interface 328 for accommodating a SIM 330 such as, for example, a SIM card, a universal SIM (USIM) card, or a universal integrated circuit card (UICC) including one or more SIM applications (e.g., ISIM, SIM, USIM, CSIM). The SIM 330 is configured to store an IMSI, an MSIDN, contact information, other device information, device settings, and the like.

Audio capabilities for the mobile device 300 may be provided by an audio I/O component 332 that includes a speaker for the output of audio signals and a microphone to collect audio signals.

The mobile device 300 may also include an image capture and processing system 334 (image system). Photos may be obtained via an associated image capture subsystem of the image system 334, for example, a camera. The mobile device 300 may also include a video system 336 for capturing, processing, recording, modifying, and/or transmitting video content. Photos and videos obtained using the image system 334 and the video system 336, respectively, may be added as message content to an MMS message and sent to another mobile device.

The illustrated mobile device 300 also includes a location component 338 for sending and/or receiving signals such as, for example, GPS data, assisted GPS (A-GPS) data, Wi-Fi™/Wi-Max™ and/or cellular network triangulation data, combinations thereof, and the like, for determining a location of the mobile device 300. The location component 338 may communicate with the communications component 320 to retrieve triangulation data for determining a location. In some embodiments, the location component 338 interfaces with cellular network nodes, telephone lines, satellites, location transmitters and/or beacons, wireless network transmitters and receivers, for example, Wi-Fi™ hotspots, radio transmitters, combinations thereof, and the like. Using the location component 338, the mobile device 300 obtains, generates, and/or receives data to identify its location, or transmits data used by other devices to determine the location of the mobile device 300.

The illustrated mobile device 300 also includes a power source 340, such as batteries and/or other power subsystem (AC or DC). The power source 340 may interface with an external power system or charging equipment via a power I/O component 342.

Figure 4:
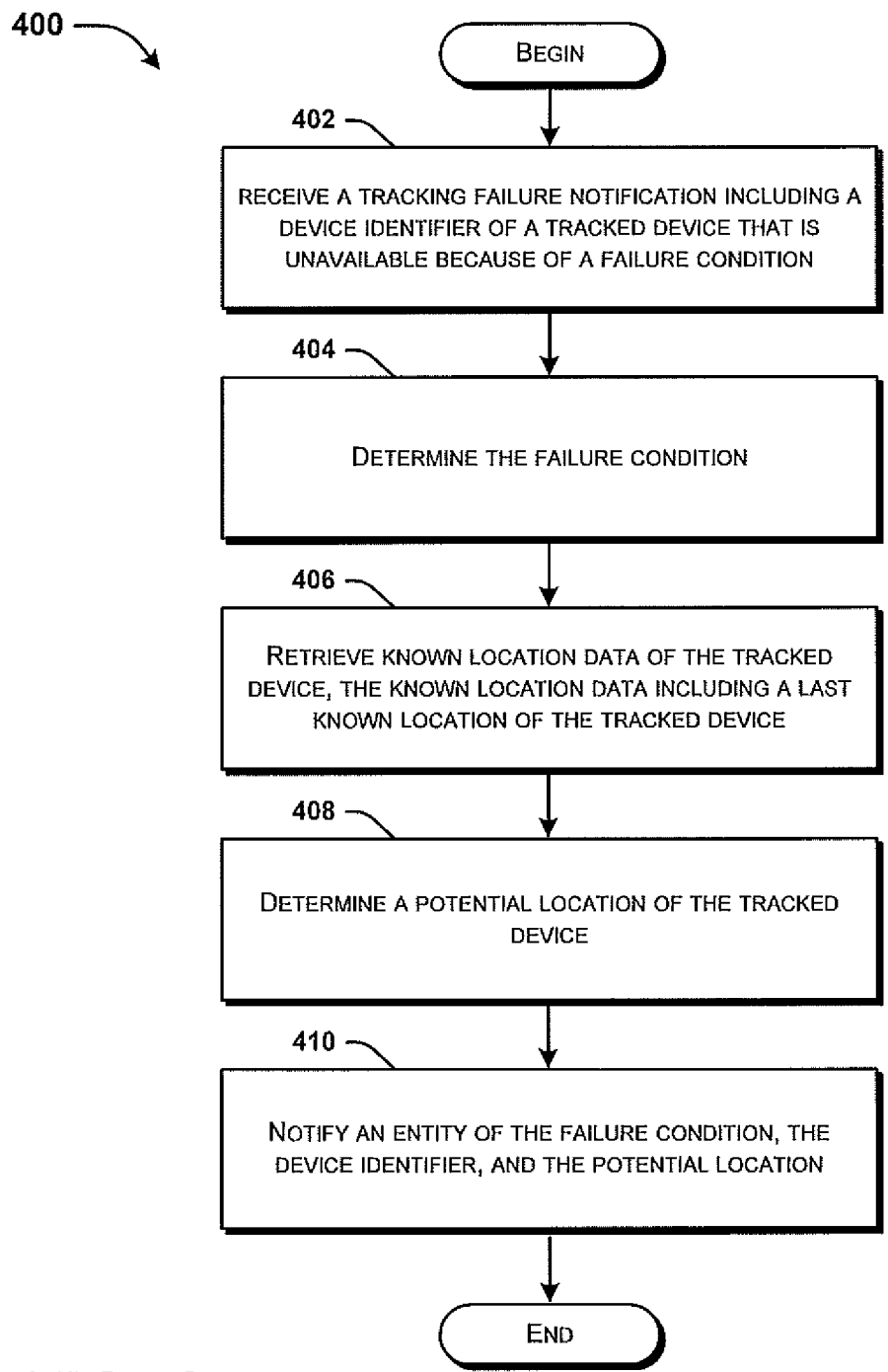
FIG. 4 illustrates a method for determining a potential location of a tracked device, according to an embodiment of the present disclosure.

Referring now to FIG. 4, a method for determining a potential location of a tracked device is illustrated, according to an embodiment of the present disclosure. It should be understood that the steps of the method 400 are not necessarily presented in any particular order and that performance of some or all the steps in an alternative order is possible and is contemplated. The steps have been presented in the demonstrated order for ease of description and illustration. Steps can be added, omitted and/or performed simultaneously without departing from the scope of the appended claims. It should also be understood that the illustrated method 400 can be ended at any time. In certain embodiments, some or all steps of this process, and/or substantially equivalent steps can be performed by execution of computer-readable instructions stored or included on a computer-readable medium.

The method 400 begins and flow is to block 402, whereat the location assessment system 120 receives a tracking failure notification according to any of the abovementioned techniques. The tracking failure notification includes a device identifier of the tracked device 106. The device identifier may be an MSISDN, an IMSI, and/or an IMEI of the tracked device 106.

At block 404, the location assessment system 120 determines the type of failure condition as being one of a network failure and a device failure. The type of failure condition, in one embodiment, is determined based upon ticket information collected, for example, by the ticketing system 134. In another embodiment, the type of failure condition is determined based upon error or other outage notifications reported by one or more network components, such as base stations, node-b, base station controllers, radio network controllers, mobile switching centers, GPRS support nodes, and the like. In some embodiments, the type of failure is assumed. In other embodiments, the type of failure is not determined until after the last known location of the tracked device 106 is retrieved, for example, directly from the location register 118 or the GMLC 116. After the last known location is retrieved, the location assessment system 120 can query the ticketing system 134 to determine if any outage tickets exist at or within a specified distance from the last known location of the tracked device 106.

At block 406, the location assessment system 120 retrieves any known location data of the tracked device 106 from the GMLC 116, the location register 118, and/or the customer database 132. This location data includes at least the last known location of the tracked device 106. At block 408, the location assessment system 120 determines a potential location of the tracked device 106 based upon at least the last known location of the tracked device 106. The potential location is an estimate of the location of the tracked device 106. In addition to the last known location, the location assessment system 120 may use a device track history (as described below with reference to FIG. 5), a time (as described below with reference to FIG. 7), a second last known location of a second tracked device (as described below with reference to FIG. 8), and/or a communications history of the tracked device 106.

At block 410, the location assessment system 120 notifies an entity of the failure condition, the device identifier, and/or the potential location. The entity may be, for example, an emergency service 122, a PSAP 124, and/or the tracking device 110, as described in greater detail above.

Figure 5:
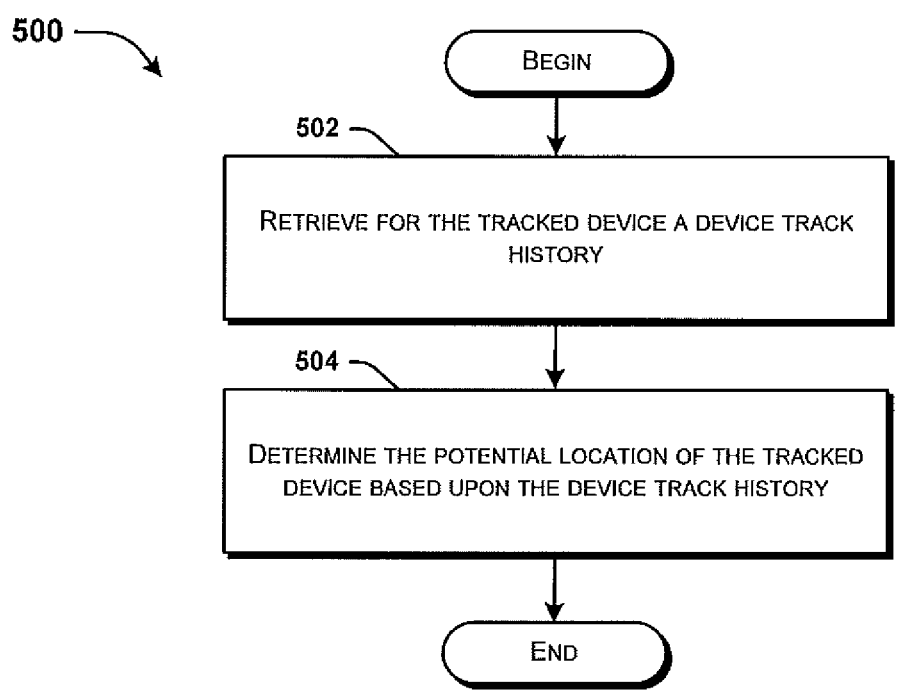
FIG. 5 illustrates a method for determining a potential location of a tracked device based upon a device track history, according to an embodiment of the present disclosure.

Referring now to FIG. 5, a method for determining a potential location of the tracked device 106 from a device track history of the tracked device 106 is illustrated, according to an embodiment of the present disclosure. It should be understood that the steps of the method 500 are not necessarily presented in any particular order and that performance of some or all the steps in an alternative order is possible and is contemplated. The steps have been presented in the demonstrated order for ease of description and illustration. Steps can be added, omitted and/or performed simultaneously without departing from the scope of the appended claims. It should also be understood that the illustrated method 500 can be ended at any time. In certain embodiments, some or all steps of this process, and/or substantially equivalent steps can be performed by execution of computer-readable instructions stored or included on a computer-readable medium. Moreover, block 502 of the method 500, in one embodiment, is performed after block 406 and before block 408 of the method 400. In addition, block 504 of the method 500, in one embodiment, is performed concurrently or in place of block 408 of the method 400.

The method 500 begins and flow is to block 502, whereat the location assessment system 120 retrieves for the tracked device 106 a device track history. The device track history, in one embodiment, includes at least one location of the tracked device 106 that may include the last known location of the tracked device 106. The location assessment system 120 may request the device track history from the location register 118. The request may include a specified time or time frame and all locations registered for the tracked device 106 at the specified time or within the time frame. In one embodiment, the specified time is a time of day, day of week, day of month, month of year, or a combination thereof.

At block 504, the location assessment system 120 determines a potential location of the tracked device 106 based upon the device track history and the last known location of the tracked device 106. For example, the location assessment system 120 analyzes the device track history in view of the last known location of the tracked device 106 to determine a potential location of the tracked device 106.

Figure 6:
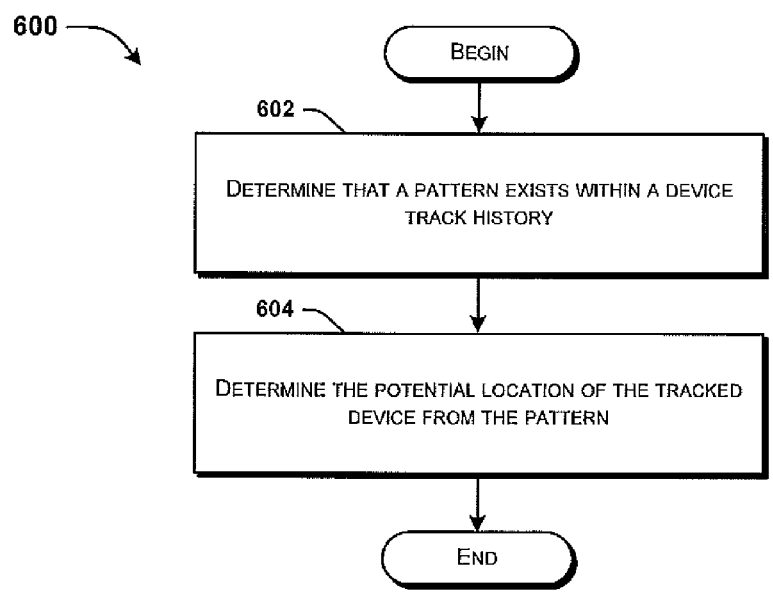
FIG. 6 illustrates a method for determining a potential location of a tracked device from a pattern determined from a device track history, according to an embodiment of the present disclosure.

Referring now to FIG. 6, a method for determining a potential location of a tracked device from a pattern determined from a device track history is illustrated, according to an embodiment of the present disclosure. It should be understood that the steps of the method 600 are not necessarily presented in any particular order and that performance of some or all the steps in an alternative order is possible and is contemplated. The steps have been presented in the demonstrated order for ease of description and illustration. Steps can be added, omitted and/or performed simultaneously without departing from the scope of the appended claims. It should also be understood that the illustrated method 600 can be ended at any time. In certain embodiments, some or all steps of this process, and/or substantially equivalent steps can be performed by execution of computer-readable instructions stored or included on a computer-readable medium. Moreover, block 602 of the method 600, in one embodiment, is performed after block 502 and before block 504 of the method 500. In addition, block 604 of the method 600, in one embodiment, is performed concurrently or in place of block 504 of the method 500.

The method 600 begins and flow is to block 602, whereat the location assessment system 120 determines that a pattern exists within the device track history. In one embodiment, the location assessment system 120 determines that a relationship exists between a specific time or time frame and one or more locations. For example, the tracked device 106 has a device track history indicating that the tracked device 106 is usually within a specific location or within a certain distance of the location during a specific time of day during a specific day(s) of the week. An exemplary method capturing this embodiment is illustrated and described below with reference to FIG. 7.

At block 604, the location assessment system 120 determines a potential location of the tracked device based upon the pattern. In one embodiment, the determination is further based upon a specific time, such as the time at which the tracked device 106 was first known to be unavailable.

Figure 7:
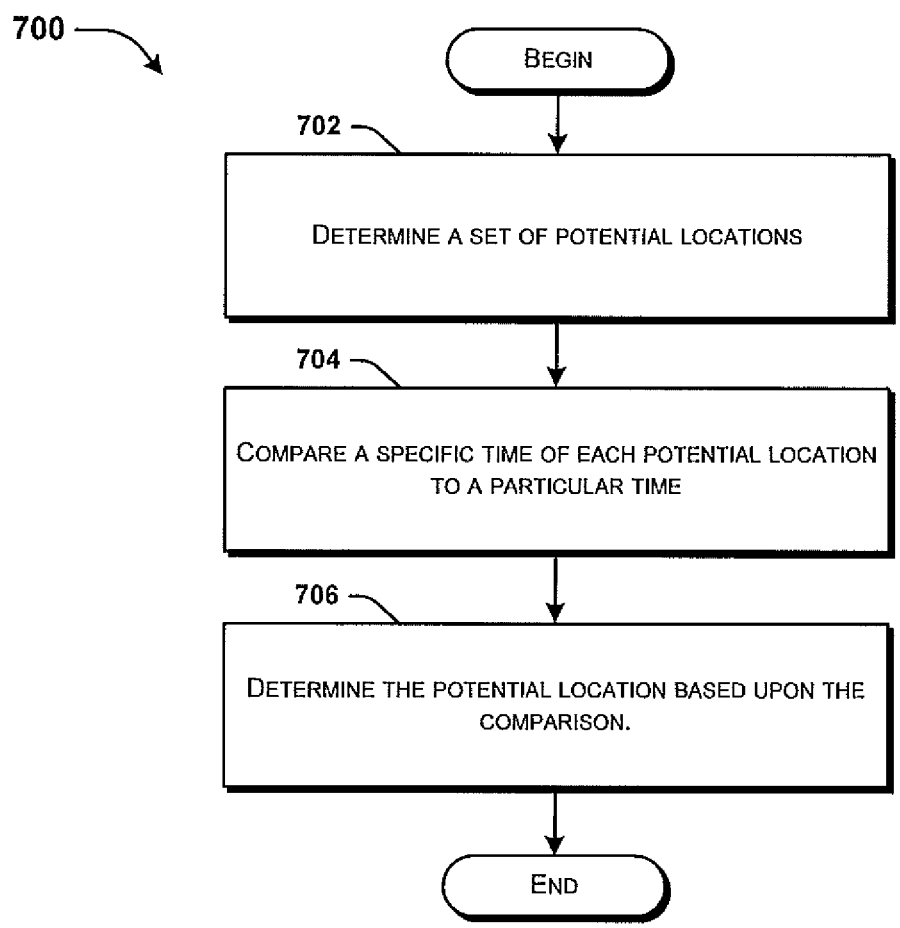
FIG. 7 illustrates a method for determining a potential location of a tracked device from a set of potential locations, according to an embodiment of the present disclosure.

FIG. 7 illustrates a method for determining a potential location of a tracked device from a set of potential locations is illustrated, according to an embodiment of the present disclosure. It should be understood that the steps of the method 700 are not necessarily presented in any particular order and that performance of some or all the steps in an alternative order is possible and is contemplated. The steps have been presented in the demonstrated order for ease of description and illustration. Steps can be added, omitted and/or performed simultaneously without departing from the scope of the appended claims. It should also be understood that the illustrated method 700 can be ended at any time. In certain embodiments, some or all steps of this process, and/or substantially equivalent steps can be performed by execution of computer-readable instructions stored or included on a computer-readable medium. Moreover, blocks 702 through 706 of the method 700, in one embodiment, are performed after block 406 and concurrently or in place of block 408 of the method 400.

The method 700 begins and flow is to block 702, whereat the location assessment system 120 determines a set of potential locations, wherein each potential location in the set of potential locations is associated with a specific time at which the tracked device 106 was at the corresponding potential location. At block 704, the location assessment system 120 compares the specific time of each corresponding potential location in the set of potential locations to a particular time specified by the location assessment system 120 or an agent operating the location assessment system 120. At block 706, the location assessment system 120 determines a potential location based upon the comparison step.

Figure 8:
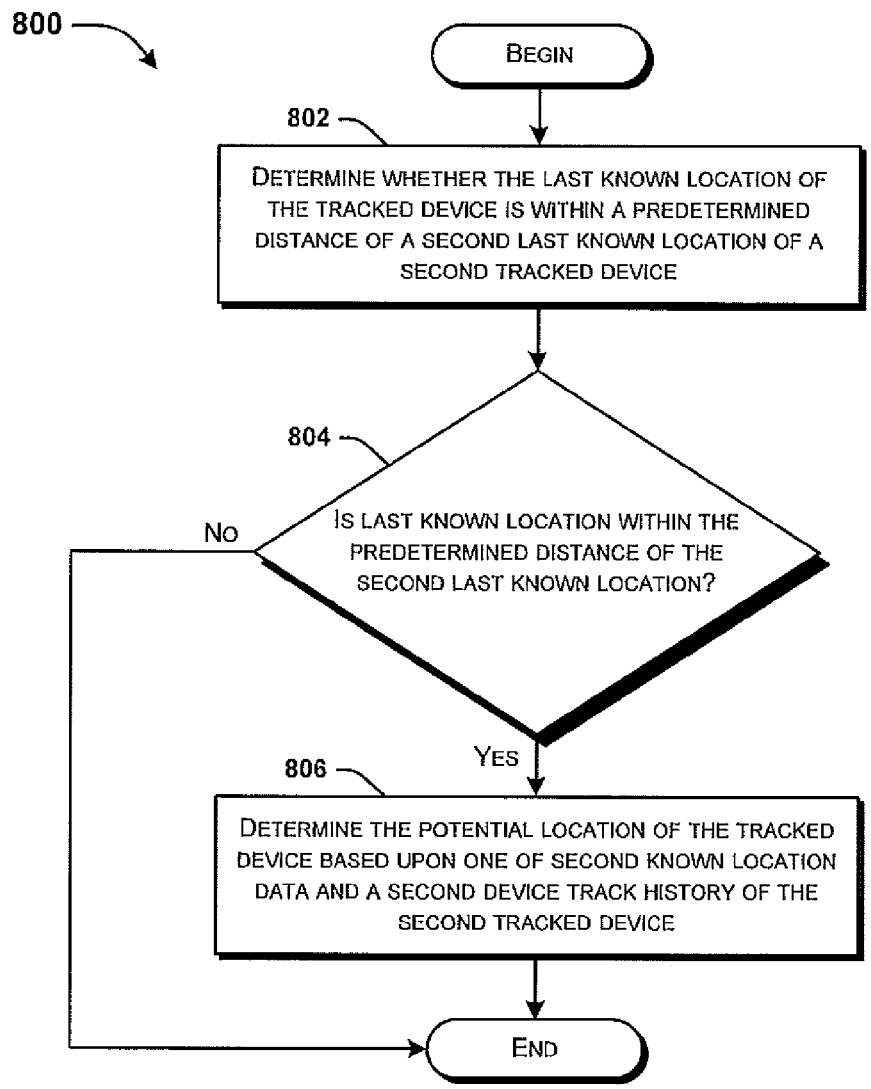
FIG. 8 illustrates a method for determining a potential location of a tracked device based upon known location data of a second tracked device, according to an embodiment of the present disclosure.

Referring now to FIG. 8, a method 800 for determining a potential location of a tracked device based upon known location data of a second tracked device is illustrated, according to an embodiment of the present disclosure. It should be understood that the steps of the method 800 are not necessarily presented in any particular order and that performance of some or all the steps in an alternative order is possible and is contemplated. The steps have been presented in the demonstrated order for ease of description and illustration. Steps can be added, omitted and/or performed simultaneously without departing from the scope of the appended claims. It should also be understood that the illustrated method 800 can be ended at any time. In certain embodiments, some or all steps of this process, and/or substantially equivalent steps can be performed by execution of computer-readable instructions stored or included on a computer-readable medium. Moreover, blocks 802 through 806 of the method 800, in one embodiment, are performed after block 406 and concurrently or in place of block 408 of the method 400.

The method 800 begins and flow is to block 802, whereat the location assessment system 120 determines whether the last known location of the tracked device 106 is within a predetermined distance of a second last known location of a second tracked device for which a second tracking failure notification including the second last known location has been received. At block 804, the location assessment system 120 determines if the last known location of the tracked device 106 is within the predetermined distance of the second last known location of the second tracked device. If the last known location of the tracked device 106 is not within the predetermined distance of the second last known location, the method 800 ends. Otherwise, at block 806, the location assessment system 120 determines the potential location of the tracked device 106 based upon one of second known location data of the second tracked device and a second device track history of the second tracked device as it correlates to the same of the tracked device 106.

Figure 9:
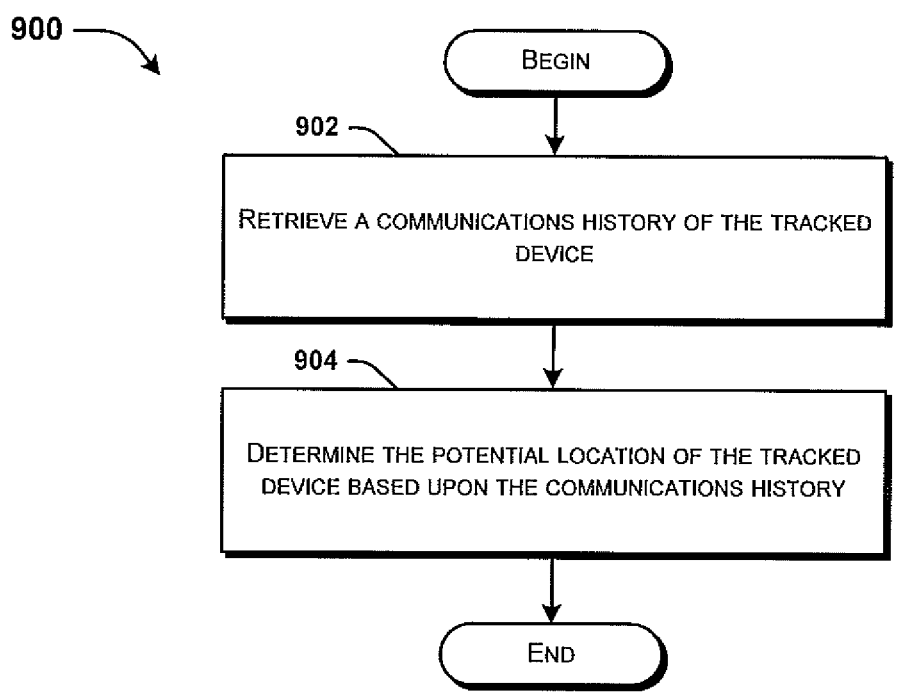
FIG. 9 illustrates a method for determining a potential location of a tracked device based upon a communications history of the tracked device, according to an embodiment of the present disclosure.

FIG. 9 illustrates a method for determining a potential location of a tracked device based upon a communications history of the tracked device, according to an embodiment of the present disclosure. It should be understood that the steps of the method 900 are not necessarily presented in any particular order and that performance of some or all the steps in an alternative order is possible and is contemplated. The steps have been presented in the demonstrated order for ease of description and illustration. Steps can be added, omitted and/ or performed simultaneously without departing from the scope of the appended claims. It should also be understood that the illustrated method 900 can be ended at any time. In certain embodiments, some or all steps of this process, and/or substantially equivalent steps can be performed by execution of computer-readable instructions stored or included on a computer-readable medium. Moreover, block 902 of the method 900, in one embodiment, is performed after block 406 and concurrently or in place of block 408 of the method 400.

The method 900 begins and flow is to block 902, whereat the location assessment system 120 retrieves a communications history of the tracked device 106. The location assessment system 120 retrieves the communications history of the tracked device 106 from the CDR database 114. At block 904, the location assessment system 120 determines the potential location of the tracked device 106 based upon the communications history.

It should be understood that one or more potential locations of the tracked device 106 may be determined based upon any combination of the methods or individual steps of the methods, where applicable, described above with referenced to FIGS. 4-9.

The disclosed embodiments are merely examples that may be embodied in various and alternative forms, and combinations thereof. As used herein, for example, "exemplary," and similar terms, refer expansively to embodiments that serve as an illustration, specimen, model or pattern. The figures are not necessarily to scale and some features may be exaggerated or minimized, such as to show details of particular components. In some instances, well-known components, systems, materials or methods have not been described in detail in order to avoid obscuring the systems, methods, and computer program products of the present disclosure. Therefore, specific structural and functional details disclosed herein are not to be interpreted as limiting, but merely as a basis for the claims and as a representative basis for teaching one skilled in the art.

The law does not require and it is economically prohibitive to illustrate and teach every possible embodiment of the present claims. Hence, the above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:

1. A tangible computer-readable storage device comprising computer-executable instructions that, when executed by a processor, cause the processor to perform operations comprising:
   receiving a tracking-failure notification, the tracking-failure notification comprising a device identifier of a tracked device that is unavailable because of a failure condition;
   determining the failure condition, the failure condition being selected from a group consisting of a network failure and a tracked-device failure;
   retrieving last-known-location data of the tracked device, the last-known-location data comprising a last-known location of the tracked device;
   determining a set of potential locations of the tracked device;
   retrieving a device track history corresponding to the tracked device;
   determining a potential location of the tracked device from among the set of potential locations using the device track history corresponding to the tracked device, wherein each potential location in the set of potential locations is associated with a specific time at which the tracked device was at the potential location determined, and wherein determining the potential location comprises:
      determining that a pattern exists within the device track history;
      comparing the specific time of each corresponding potential location in the set potential locations to a particular time; and
      determining the potential location using the pattern and based upon results of the comparing; and
   notifying an entity of the failure condition, the device identifier, and the potential location.

2. The tangible computer-readable storage device of claim 1, wherein the tracking-failure notification is received in a communication selected from a group consisting of: a call; a short messaging service message; a multimedia messaging service message; an email; an interactive voice response message; an emergency services message; and a direct input message.

3. The tangible computer-readable storage device of claim 1, wherein the device identifier is selected from a group consisting of: a mobile station international integrated services digital network number; an international mobile subscriber identity; and an international mobile equipment identity.

4. The tangible computer-readable storage device of claim 1, wherein the operations further comprise:
   determining whether the last-known location of the tracked device is within a predetermined distance of a second last-known location of a second tracked device for which a second tracking-failure notification comprising the second last-known location has been received; and
   determining, if the last-known location of the tracked device is within the predetermined distance of the second last-known location of the second tracked device, the potential location of the tracked device using one of second last-known-location data of the second tracked device and a second device track history of the second tracked device.

5. The tangible computer-readable storage device of claim 1, wherein:
   the operations further comprise retrieving a communications history of the tracked device, the communications history comprising a type of history selected from a group consisting of a call history, a message history, and a date history for communications that occur during a particular time period; and
   determining the potential location of the tracked device comprises determining the potential location of the tracked device based upon the communications history of the tracked device.

6. The tangible computer-readable storage device of claim 1, wherein the operation of retrieving the last-known-location data of the tracked device comprises retrieving the last-known-location data from a location database comprising location information for location-based services subscribers.

7. A method, comprising:
   receiving, by a location assessment system using a computer processor, a tracking-failure notification, the tracking-failure notification comprising a device identifier of a tracked device that is unavailable because of a failure condition;
   determining, by the location assessment system using the computer processor, the failure condition, the failure condition being selected from a group consisting of a network failure and a tracked-device failure;
   retrieving, by the location assessment system using the computer processor, last-known-location data of the tracked device, the last-known-location data comprising a last-known-location of the tracked device;

determining, by the location assessment system using the computer processor, a set of potential locations of the tracked device;

retrieving, by the location assessment system, a device track history corresponding to the tracked device;

determining, by the location assessment system using the computer processor, a potential location of the tracked device from among the set of potential locations using the device track history corresponding to the tracked device, wherein each potential location in the set of potential locations is associated with a specific time at which the tracked device was at the potential location determined, and wherein determining the potential location comprises:

determining that a pattern exists within the device track history;

comparing the specific time of each corresponding potential location in the set of potential locations to a particular time; and determining the potential location using the pattern and based upon results of the comparing; and notifying, by the location assessment system using the computer processor, an entity of the failure condition, the device identifier, and the potential location.

8. The method of claim 7, further comprising:

determining whether the last-known location of the tracked device is within a predetermined distance of a second last-known location of a second tracked device for which a second tracking-failure notification comprising the second last-known location has been received; and determining, if the last-known location of the tracked device is within the predetermined distance of the second last-known location of the second tracked device, the potential location of the tracked device using one of second last-known-location data corresponding to the second tracked device and a second device track history corresponding to the second tracked device.

9. The method of claim 7, wherein:

the method further comprises retrieving a communications history of the tracked device, the communications history comprising a type of history selected from a group consisting of a call history, a message history, and a data history for communications that occur during a particular time period; and determining the potential location of the tracked device comprises determining the potential location of the tracked device based upon the communications history of the tracked device.

10. A location assessment system, comprising:

a processor; and a memory having stored thereon computer-executable instructions that, when executed by the processor, cause the processor to perform operations comprising:

receiving a tracking-failure notification, the tracking-failure notification comprising a device identifier of a tracked device that is unavailable because of a failure condition;

determining the failure condition, the failure condition being selected from a group consisting of a network failure and a tracked-device failure;

retrieving last-known-location data of the tracked device, the last-known-location data comprising a last-known location of the tracked device;

determining a set of potential locations of the tracked device;

retrieving a device track history corresponding to the tracked device;

determining a potential location of the tracked device from among the set of potential locations using the device track history corresponding to the tracked device, wherein each potential location in the set of potential locations is associated with a specific time at which the tracked device was at the potential location determined, and wherein determining the potential location comprises:

determining that a pattern exists within the device track history;

comparing the specific time of each corresponding potential location in the set of potential locations to a particular time; and determining the potential location of the tracked device using the pattern and the results of the comparing; and notifying an entity of the failure condition, the device identifier, and the potential location.

11. The system of claim 10, wherein the operations further comprise:

determining whether the last-known location of the tracked device is within a predetermined distance of a second last-known location of a second tracked device for which a second tracked failure notification comprising the second last-known location has been received; and determining, if the last-known location of the tracked device is within the predetermined distance of the second last-known location of the second tracked device, the potential location of the tracked device using one of a second last-known-location data of the second tracked device and a second device track history of the second tracked device.

* * * * *